United States Patent Office 3,421,421
Patented Jan. 14, 1969

3,421,421
PHOTOGRAPHIC AND CINEMAGRAPHIC
CAMERAS
Werner Hahn, Wolfgang Planert, Heinz Schulze, and Heinz Wolf, Dresden, Germany, assignors to VEB Pentacon Dresden Kamera- und Kinowerke, Dresden, Germany
Filed Nov. 18, 1965, Ser. No. 508,522
U.S. Cl. 95—10                3 Claims
Int. Cl. G01j 1/00; G03b 19/04; G03b 7/08

ABSTRACT OF THE DISCLOSURE

In a camera having a photoelectric exposure control and an insertable film cassette, the cassette is rendered simpler and more reliable by providing on the cassette a contact bar that extends beyond a corresponding stop on the camera as far as a row of resilient contacts likewise provided on the camera. The resilient contacts are in circuit with resistances of the exposure control, and contact is established between the contact bar and the contacts upon insertion of the film cassette.

---

Figure 1:
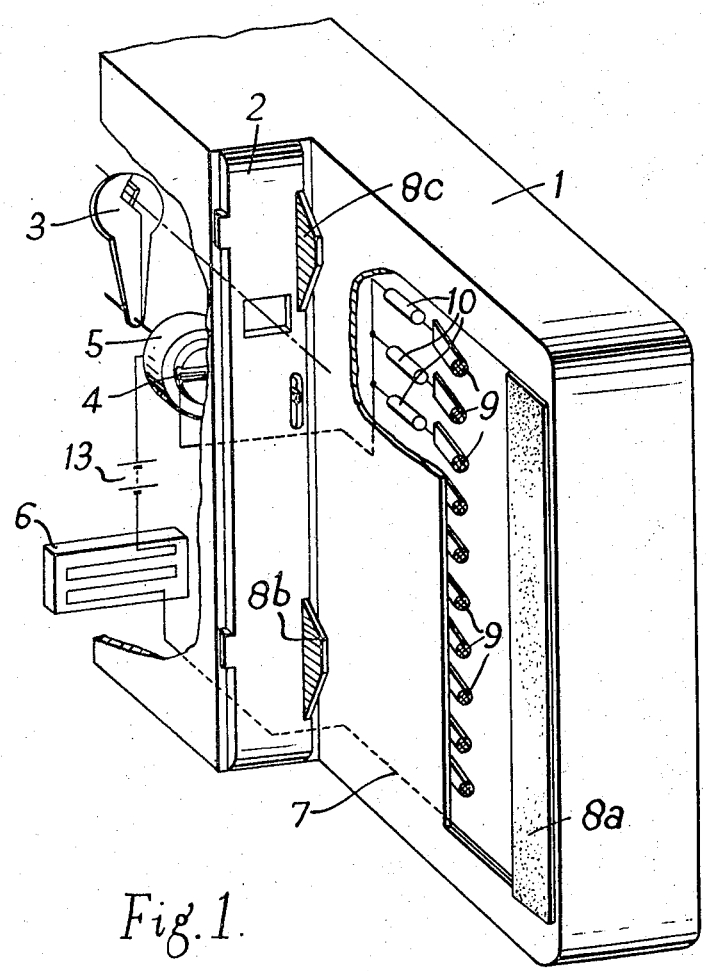

The invention relates to a photographic or cinematographic camera having a photo-electric exposure control device and an insertable film cassette having a contact bar for the bridging of contacts which are provided on the camera side and which are connected on electrically conductive lines with resistances provided in the circuit of the exposure control device in order to take account of exposure factors independent of the brightness, such as the film speed or the filter factor, and having stops situated opposite one another in pairs and provided both on the camera and on the film cassette in order to secure these latter in position in relation to each other.

To enable setting factors unaffected by the light conditions to be taken into account automatically the film cassettes of known cameras are provided with adjusting cams or contact bars which are differently constructed and which either act on movable parts of an exposure control device or bridge branches which are provided in the control circuit and which are equipped with resistances. To ensure functional reliablilty as regards the guiding of the film and as regards the connection of the adjusting cams or contact bars with the exposure control device of the camera, these systems also have stops which are situated opposite one another in pairs and provided on the camera and on the cassette and of which the positions must be accurately dimensioned in relation to the gearing connecting points on the camera and also in relation to the adjusting cams or contact bars. This dual positional restriction to which the stops are subject necessitates considerable care and precision in the production of such cassettes, quite apart from the additional expense involved in constructing the separate stops and adjusting cams or contact bars.

The purpose of the invention is to provide a simpler and operationally more reliable construction for the cassette as regards the method of securing it in position and as regards the automatic selection of the setting called for by certain factors affecting the exposure but independent of the conditions of brightness prevailing.

In the invention this result is obtained by a system in which a stop provided on the camera itself is constructed as a contact connected with a branch of the exposure control device, while the corresponding stop on the cassette is provided with a contact bar which extends beyond the stop of the camera as far as a row of resilient contacts likewise provided on the camera, the resilient contacts being associated with a branch of the exposure control device which contains the resistances, and being connectable, on electrically conductive lines and either singly or in groups and via the contact bar, with the stop of the camera, when the film cassette is inserted. This measure enables the stops to function as contact bars as well, thus avoiding the disadvantageous dual positional dependence of the stops on the gearing connection points of the camera and on the contact bars of the cassette. In a preferred embodiment of the invention, the stop on the camera is constructed in the form of a contact strip, with the row of resilient contacts positioned parallel and the stops on the cassette with their contact bars positioned transversely to the stop on the camera. If the photo-electric cell provided consists of a battery-fed photo-resistance, then the contact bridge provided for the stop as well as for the contact bar and for the resilient contacts should preferably be positioned in the circuit so that it is in series with the battery, so that the latter will not be accidentally discharged when no film cassette is inserted. The details of the invention will emerge from the example of a cinematographic camera as illustrated and described.

Figure 2:
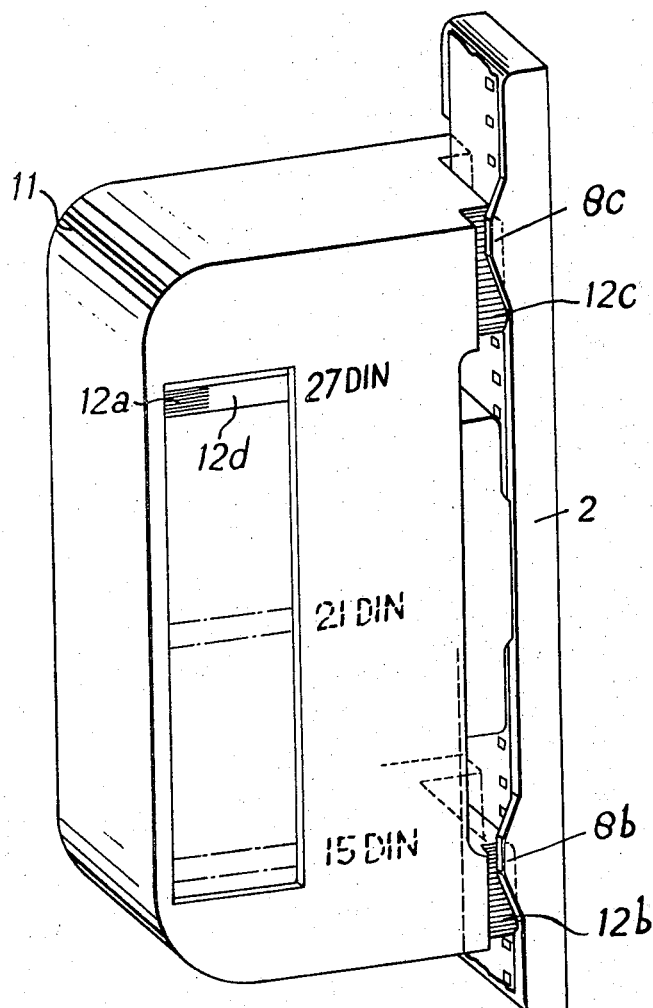

In the drawings:
FIGURE 1 shows the exposure control device on the camera;
FIGURE 2 shows the insertable film cassette.

In the housing 1 (cf. FIG. 1) of the camera, of which housing only part is shown in the drawing, the lens diaphragm 3, which is coupled with the moving coil 4 of the measuring mechanism 5, is mounted in front of the first film track 2. The photo-electric cell 6, of which the first pole is connected via a conductor 7 with the stop 8a provided on the camera and constructed in the form of a contact strip, is situated on the gate side of the housing 1. Parallel with the stop 8a are a row of resilient contacts 9, each of which is connected via a resistance 10 and the moving coil 4 with the second pole of the photo-electric cell 6. The resistances 10 are of different magnitudes and serve to enable different film speeds to be taken into account. The film cassette 11 (cf. FIG. 2) is provided with stops 12a and 12b. The stop 12a has a contact bar 12b which forms a prolongation of the stop 12a and extends as far as the row of contacts 9 provided on the camera. The stop 12a with its contact bar 12d is positioned differently in the film cassette 11 according to the type of film (e.g. 27 0/10 DIN), with which the camera is loaded.

The method of operation is as follows:
The film cassette 11 has a stop 12a rolonged by a distance corresponding to the contact bar 12d and in a position corresponding to the particular type of film inserted. When the film cassette 11 is inserted in the housing 1 of the camera, the stops 12a, 12b and 12c of the film cassette come to rest against the stops 8a, 8b and 8c of the housing 1, thus establishing the position of the film cassette 11 in the housing 1. At the same time the stop 12a comes to rest by its contact bar 12d on one of the resilient contacts 9, so that the measuring circuit is established via one of the resistances 10. The exposure control devices 3, 4, 5 and 6 is thus adapted to the speed of the type of film in use.

In the case of an exposure control device of this type and having a battery-fed photo-resistance, the stops 8a and 12a in conjunction with the contact bar 12d and the resilient contacts 9 serve as safety switches for the prevention of any accidental discharge of the battery when the camera is not being used.

We claim:
1. In a camera having a photo-electric exposure-control device as well as an insertable film cassette removably received therein, said cassette having a contact bar for the bridging of contacts which are provided on the camera side and which are connected on electrically conductive lines with resistances provided in the circuit of the exposure control device in order to take account of exposure factors independent of the brightness and having stops situated opposite one another in pairs and provided both on the camera and on the film cassette in order to secure these latter in position in relation to each other; the improvement comprising the provision of a stop provided on the camera itself and constructed as a contact connected with a branch of the exposure control device, a corresponding stop on the cassette, a contact bar on the cassette stop which extends beyond the camera stop, provided on the camera, a part of the exposure control device associated with said contacts, and means including said contact bar whereby said contacts are connected electrically with the camera stop when the film cassette is inserted in the camera.

2. A camera in accordance with claim 1, wherein the camera stop is constructed as a contact strip and said contacts are positioned in a row parallel to said strip and the cassette stop with its contact bar is positioned transversely to the camera stop.

3. A camera in accordance with claim 1 wherein the photo-electric cell consisting of a battery-fed photo-resistance, and wherein the contact bridge formed by the stops, by the contact bar and by the resilient contacts is positioned in the control circuit in such a way as to be in series with the battery.

References Cited

UNITED STATES PATENTS

| | | | |
|---|---|---|---|
| 2,186,611 | 1/1940 | Martin | 95—10 XR |
| 2,186,613 | 1/1940 | Mihalyi | 95—10 XR |
| 3,025,777 | 3/1962 | Wilkenson | 95—10 |
| 3,194,133 | 7/1965 | Benson | 95—10 |
| 3,208,363 | 9/1965 | Easterly et al. | 95—10 XR |
| 3,212,421 | 10/1965 | Hackenberg | 95—10 XR |
| 3,266,395 | 8/1966 | Kremp et al. | 95—10 |

NORTON ANSHER, *Primary Examiner.*

J. F. PETERS, JR., *Assistant Examiner.*

U.S. Cl. X.R.

95—31; 352—72, 141